(12) United States Patent
Xu et al.

(10) Patent No.: US 7,941,167 B2
(45) Date of Patent: May 10, 2011

(54) MOBILE DEVICE SYNCHRONIZATION BASED ON PROXIMITY TO A DATA SOURCE

(75) Inventors: Jon Xu, Bellevue, WA (US); Dominique Fortier, Snoqualmie, WA (US); Anil Kumar Dhawan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 11/094,921

(22) Filed: Mar. 31, 2005

(65) Prior Publication Data
US 2006/0223556 A1  Oct. 5, 2006

(51) Int. Cl.
*H04B 7/00* (2006.01)
*H04B 15/00* (2006.01)

(52) U.S. Cl. .................. 455/502; 455/550.1
(58) Field of Classification Search .......... 455/502
See application file for complete search history.

(56) References Cited

U.S. PATENT DOCUMENTS

| | | | |
|---|---|---|---|
| 6,721,561 B1* | 4/2004 | Jeong et al. ............. | 455/433 |
| 2001/0053697 A1* | 12/2001 | Nakada ................ | 455/456 |
| 2002/0133595 A1* | 9/2002 | Kimura et al. ......... | 709/227 |
| 2002/0180606 A1* | 12/2002 | Kitaguchi et al. ...... | 340/573.1 |
| 2005/0286478 A1* | 12/2005 | Mela et al. ............ | 370/338 |
| 2007/0177571 A1* | 8/2007 | Caulfield et al. ...... | 370/350 |

* cited by examiner

*Primary Examiner* — Duc Nguyen
*Assistant Examiner* — Ankur Jain
(74) *Attorney, Agent, or Firm* — Woodcock Washburn LLP

(57) ABSTRACT

A system for data communication is disclosed. The system comprises a detection module that ascertains when a mobile wireless communication device is located within a first range of a data source. The system further comprises a data module that automatically sends information to the mobile wireless communication device when the mobile wireless communication device is within the first range. Methods of using the system are also disclosed.

16 Claims, 14 Drawing Sheets in accordance with an aspect of the disclosed invention.

MOBILE DEVICE SYNCHRONIZATION BASED ON PROXIMITY TO A DATA SOURCE

TECHNICAL FIELD

The disclosed invention relates generally to the field of data communications and specifically relates to systems and methods for initiating and performing data transfers based upon physical proximity of devices.

BACKGROUND

Mobile communication devices such as personal information managers, personal digital assistants, palmtop computers, and cellular telephones typically support at least one type of wireless data communications technology and usually can support multiples types and communications protocols. Among the most prevalent wireless technologies are code division multiple access (CDMA), time division multiple access (CDMA), global system for mobile communications (GSM), IEEE 802.11x, and Bluetooth. These and other wireless technologies permit transfers of data between and among devices without the necessity of physical cable connections.

Mobile communication devices are often paired with a primary computing system such as a personal computer. The paired primary computing system commonly serves as a backup system for data on the mobile communications device. Other functions, such as data retrieval for further transmission to the mobile communication devices, can also be implemented.

Currently, data transfers between or among such wireless communications devices are explicitly initiated by a user of the device. This scheme can often result in discrepancies among data sets on the mobile communication device and the computing system. The user typically must remember to initiate a data transfer, like a synchronization process, to ensure that both sets of data remain consistent. The user commonly must also remember to update at least one of the data sets prior to a synchronization process so that the user has current data. Failing to perform either step can result in incomplete or inaccurate data on the mobile communication device, the paired primary computing system, or both.

SUMMARY

The following presents a simplified summary in order to provide a basic understanding. This summary is not an extensive overview. It is not intended to identify key or critical elements of the invention or to delineate the scope of the invention. Its sole purpose is to present some concepts of the invention in a simplified form as a prelude to a more detailed description that is presented later. Additionally, section headings used herein are provided merely for convenience and should not be taken as limiting in any way.

In accordance with one aspect of the invention, an information system automatically detects when a wireless communication device travels within range of the system. The system automatically sends data to the wireless communication device in response to detection of the wireless communication device. Such transfer occurs without user interaction.

In accordance with another aspect of the invention, a data system automatically detects when a wireless communication device travels within range of the system. The system automatically verifies whether the wireless communication device is a known device in the sense that the wireless communication device has been paired with the data system or otherwise possesses security credentials sufficient to gain access to the data system. If verified, the data system automatically transfers data to or synchronizes data with the wireless communication device.

Another aspect of the invention involves a proximity detector. An information system determines whether a wireless mobile device is within range of the system. If so, the system automatically sends a first set of data to the wireless mobile device. The system then detects whether the wireless mobile device is within a second range detected by the proximity detector. If so, the system automatically sends a second set of data to the wireless mobile device.

Yet another aspect of the invention involves the formation of personal area networks. Such networks are automatically formed when a wireless communication device is detected to be within range of at least one other wireless communication device. Automatic data exchanges based on simple detection and/or proximity can be employed to provide transparent data flows between or among devices. Applications of such personal area networks include business conventions and gaming.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed. The subject invention is intended to include all such aspects and their equivalents. Other objects, advantages and novel features of the invention will become apparent from the following detailed description of the invention when considered in conjunction with the drawings.

DETAILED DESCRIPTION

Figure 1:
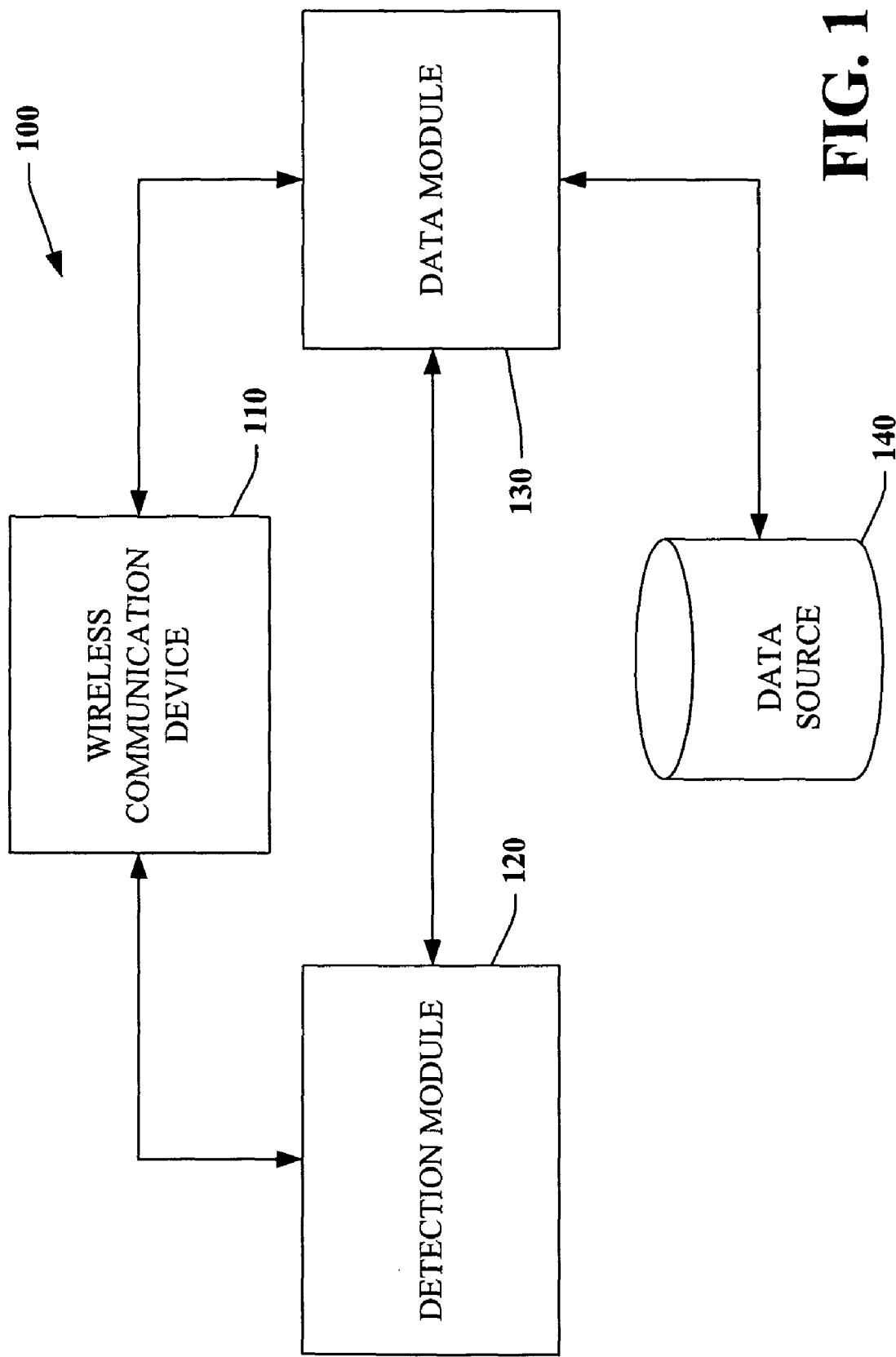
FIG. 1 is a system block diagram of a data communication system in accordance with one aspect of the invention.

The subject invention relates to systems and methods to facilitate replacement of software components. As used in this application, the terms "component," "system," "module," and the like are intended to refer to a computer-related entity, either hardware, software (for example, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention. Additionally, although specific examples set forth may use terminology that is consistent with client/server architectures or may even be examples of client/server implementations, skilled artisans will appreciate that the roles of client and server may be reversed, that the subject invention is not limited to client/server architectures and may be readily adapted for use in other architectures, specifically including peer-to-peer (P2P) architectures, without departing from the spirit or scope of the invention. Further, it should be noted that although specific examples presented herein include or reference specific components such as device drivers, the invention is not limited to those specific components or device drivers and can be employed in other contexts as well.

FIG. 1 is a system block diagram of a data communication system 100 in accordance with one aspect of the invention. The data communication system 100 includes a wireless communication device 110. The wireless communication device 110 can be a personal information manager, a personal digital assistant, a palmtop computer, a cellular telephone, or another device with wireless data capabilities. A detection module 120 detects when the wireless communication device 110 is within range of a data module 130. It should be noted that when referring to a device being within range of the data module, such reference specifically includes, but is not limited to, being within range of a transmitter or receiver that is associated with the data module 130. The data module 130 can access a data source 140 that contains data to be sent to the wireless communication device 110. The data source can be a database, a file, an information server such as a file transfer protocol (FTP) or hypertext transfer protocol (HTTP or web) server, or another suitable information source.

One example of an aspect of operation follows. The wireless communication device 110 can broadcast an identifying signal, such as a unique device identifier, to any available listening devices. When the wireless communication device 110 is within range of the detection module 120, the detection module 120 can receive the identifying signal that was broadcast from the wireless communication device 110. The detection module 120 is able to signal the data module 130 to cause the data module 130 to initiate a data transfer to the wireless communication device 110. The data module 130 can then access the data source 140 to retrieve information of interest and transmit that information to the wireless communication device 110.

The information transmitted by the data module 130 can be sent in the form of a generic broadcast that can be received by any capable device in the vicinity or within range of the broadcast, such as the wireless communication device 110. Alternatively or additionally, the signal from the detection module 130 can include identifying information, for example, a machine address, a unique name, or some other suitable identifier, for the wireless communication device. The data module 130 can use that identifying information to send the information of interest from the data source 140 specifically to the wireless communication device 110.

Figure 2:
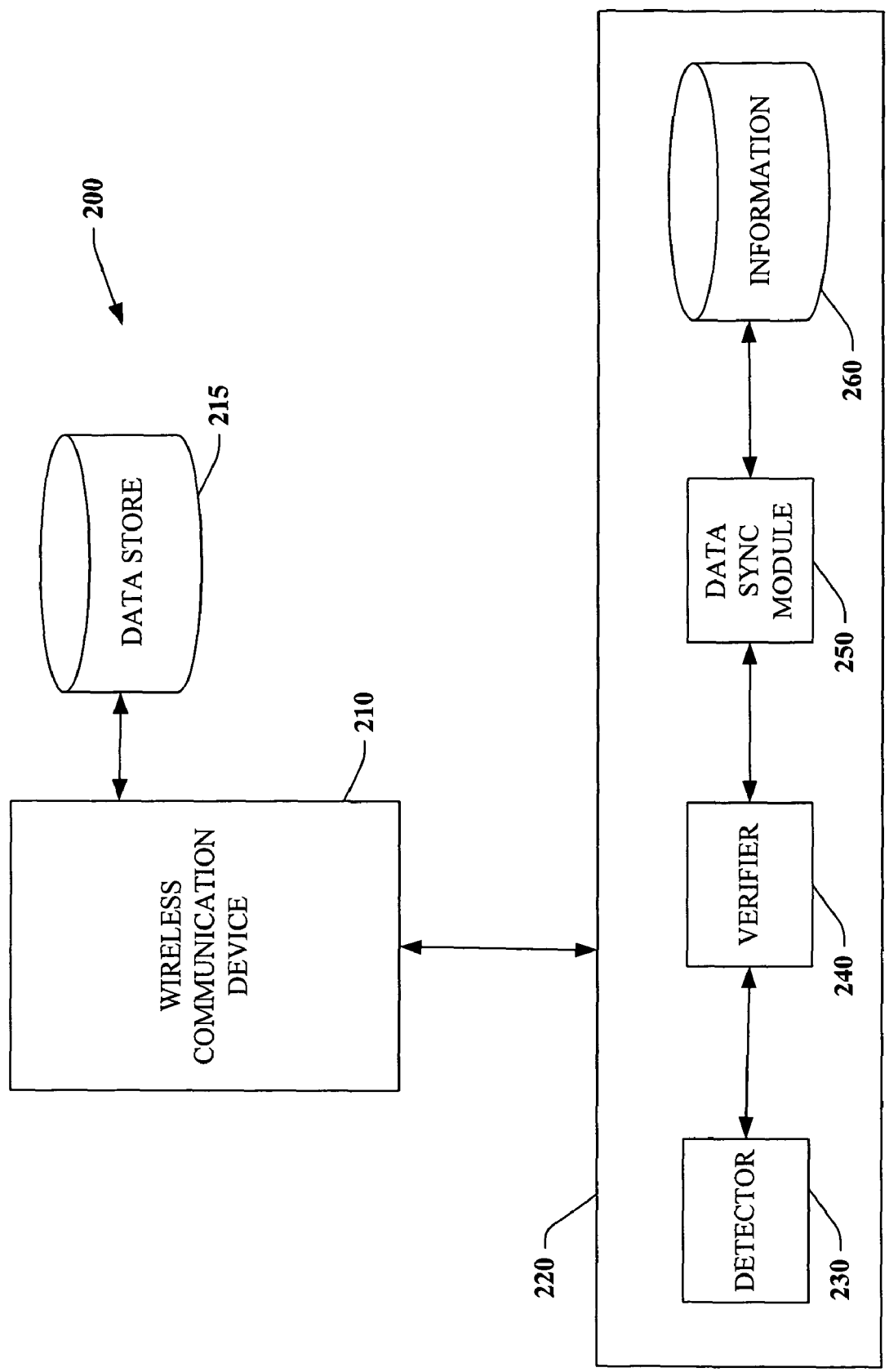
FIG. 2 is a system block diagram of a data communication system in accordance with another aspect of the invention.

FIG. 2 is a system block diagram of a data communication system 200 in accordance with another aspect of the invention. A wireless communication device 210 includes an internal data store 215. The wireless communication device 210 can connect to an information system 220. The information system 220 includes a detector 230 that can recognize when the wireless communication device 210 is within proximity of the information system 220. The detector 230 can send a signal to a verifier 240 that can determine whether the wireless communication device 210 is a known device. The concept of a known device includes, but is not limited to, any device with a previously ascertained identity or a device with appropriate security credentials like a certificate.

The verifier 240 can initiate operation of a data synchronization module 250. The data synchronization module 250 is able to access an information data store 260 to obtain desired information for the wireless communication device 210. The data synchronization module 250 can send information from the data store 260 to the wireless communication device 210 for synchronization with information in the internal data store 215. Information that can be synchronized includes, but is not limited to, contact or address book information, text files, web content, or any other machine-readable or interpretable information.

An example of a manner of operation follows. In operation, the detector 230 can continuously or periodically poll for known devices such as the wireless communication device 210. The detector 230 can do so by sending out a data signal that notifies the wireless communication device 210 that the wireless communication device 210 is within range of the information system 220 and prompts the wireless communication device 210 to initiate a data transfer operation. The wireless communication device 210 can send a response that identifies the wireless communication device and requests a data transfer operation.

The verifier 240 can use the identification information sent by the wireless communication device 210 to ascertain whether the wireless communication device 210 is a known device or otherwise permitted to access data of the information system 220. If the verifier 240 cannot identify the wireless communication device 210 as a known device, the data synchronization module 250 can deny access to the wireless communication device 210. If, however, the verifier 240 determines that the wireless communication device 210 is authorized to access the information system 220, the data synchronization module 250 can communicate with the wireless communication device 210 to synchronize information from the data store 260 of the information system 220 with the data store 215 of the wireless communication device 210.

Figure 3:
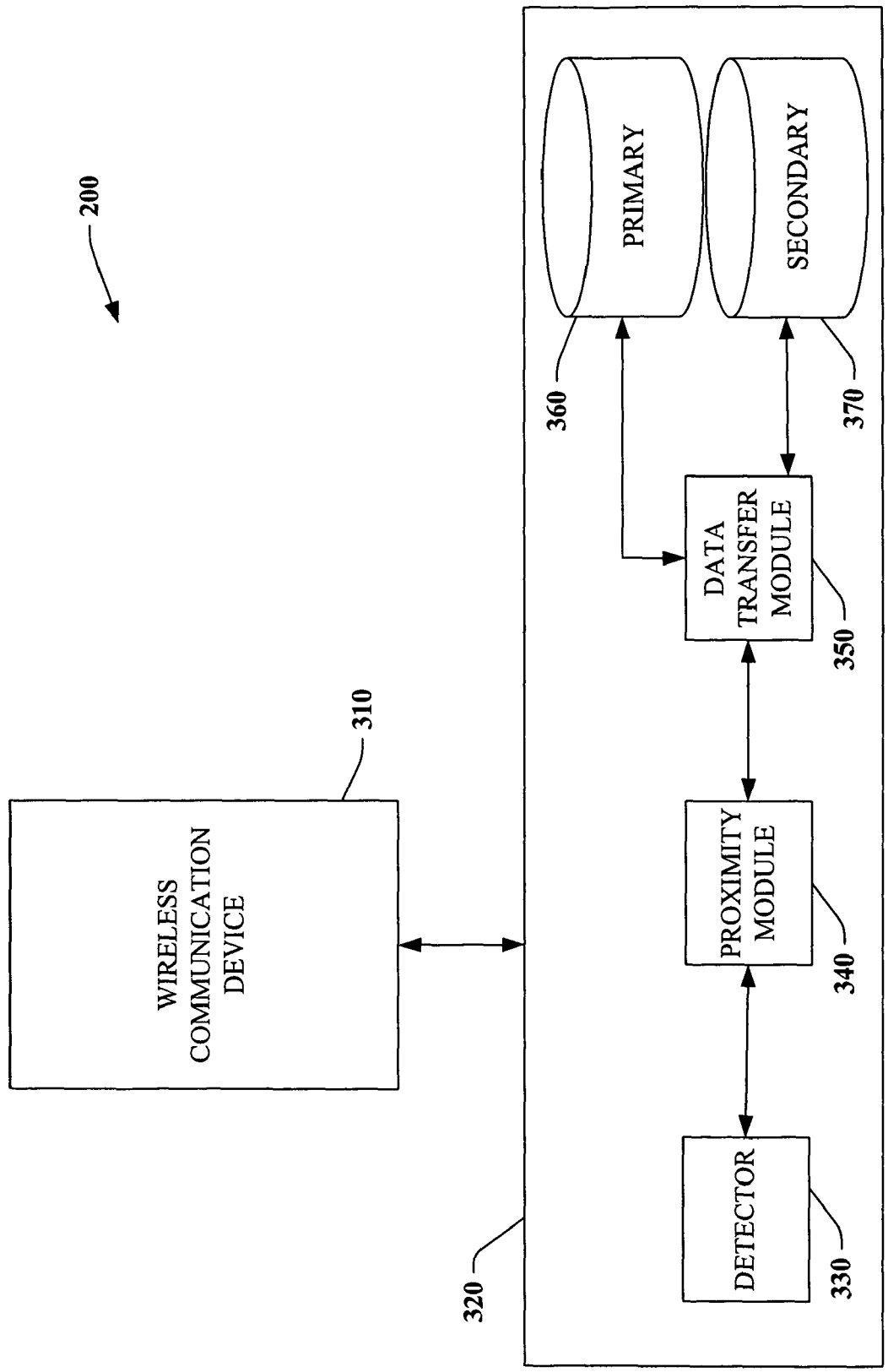
FIG. 3 is a system block diagram of an information system in accordance with an aspect of the disclosed invention.

FIG. 3 is a system block diagram of a data system 300 in accordance with an aspect of the disclosed invention. A wireless communication device 310 can connect to an information system 320. The information system 320 includes a detector 330 that can determine whether the wireless communication device 310 is within communication range. The information system 320 also includes a proximity module 340. The proximity module 340 can ascertain whether the wireless communication device 310 is within a predetermined distance from the information system 320 or another data source. The proximity module may be a component that measures signal strength of a wireless communication signal of the wireless communication device 310. In that case, signal strength can be used as a proxy for distance. Alternatively or additionally, components of another scheme such as a near-field communication system, for example, a radio frequency identification (RFID) system or other suitable device, can be used as the proximity module 340.

Both the detector 330 and the proximity module 340 can send a triggering signal to a data transfer module 350. The data transfer module 350 can use the triggering signal to determine whether to access a primary data store 360 or a secondary data store 370. Data from either the primary data store 360 or the secondary data store 370 can be sent to the wireless communication device 310 by the data transfer module 350.

One example of a possible operating scheme is as follows. In operation, the wireless communication device 310 broadcasts a signal using an appropriate system such as Bluetooth, IEEE 802.11x, infrared, or another system, that indicates its identity and presence. The detector 330 of the information system 320 receives this signal and determines that the wireless communication device is within communication range. The detector 330 sends a signal to the data transfer module 350 which accesses the primary data store 360. The data transfer module 350 sends information from the primary data store 360 to the wireless communication device 310.

If the wireless communication device travels within range of the proximity module 340, the proximity module 340 sends a second triggering signal to the data transfer module 350. If an RFID-based system is used as the proximity module 340, an activating radio signal sent from the proximity module 340 activates an RFID tag (not shown) of the wireless communication device 310 and a response signal is received by the proximity module 340. If an IEEE 802.11x-based system is used, the proximity module can measure signal strength from the wireless communication device 310 and either use signal strength as a proxy measure for distance or can calculate distance based upon signal strength and other information like specific information about the wireless communication device 310. Other means can also be employed.

The second triggering signal is received by the data transfer module 350 which accesses the secondary data store 370. The secondary data store 370 contains different information than the primary data store 360. Information from the secondary data store 370 is sent by the data transfer module 350 to the wireless communication device 310. It should be appreciated that in this example, the various detections, activations, and data transmissions are automatic in the sense that each occurs without an explicit command from, or interaction with, a user of the wireless communication device 310 or a user of the information system 320.

Figure 4:
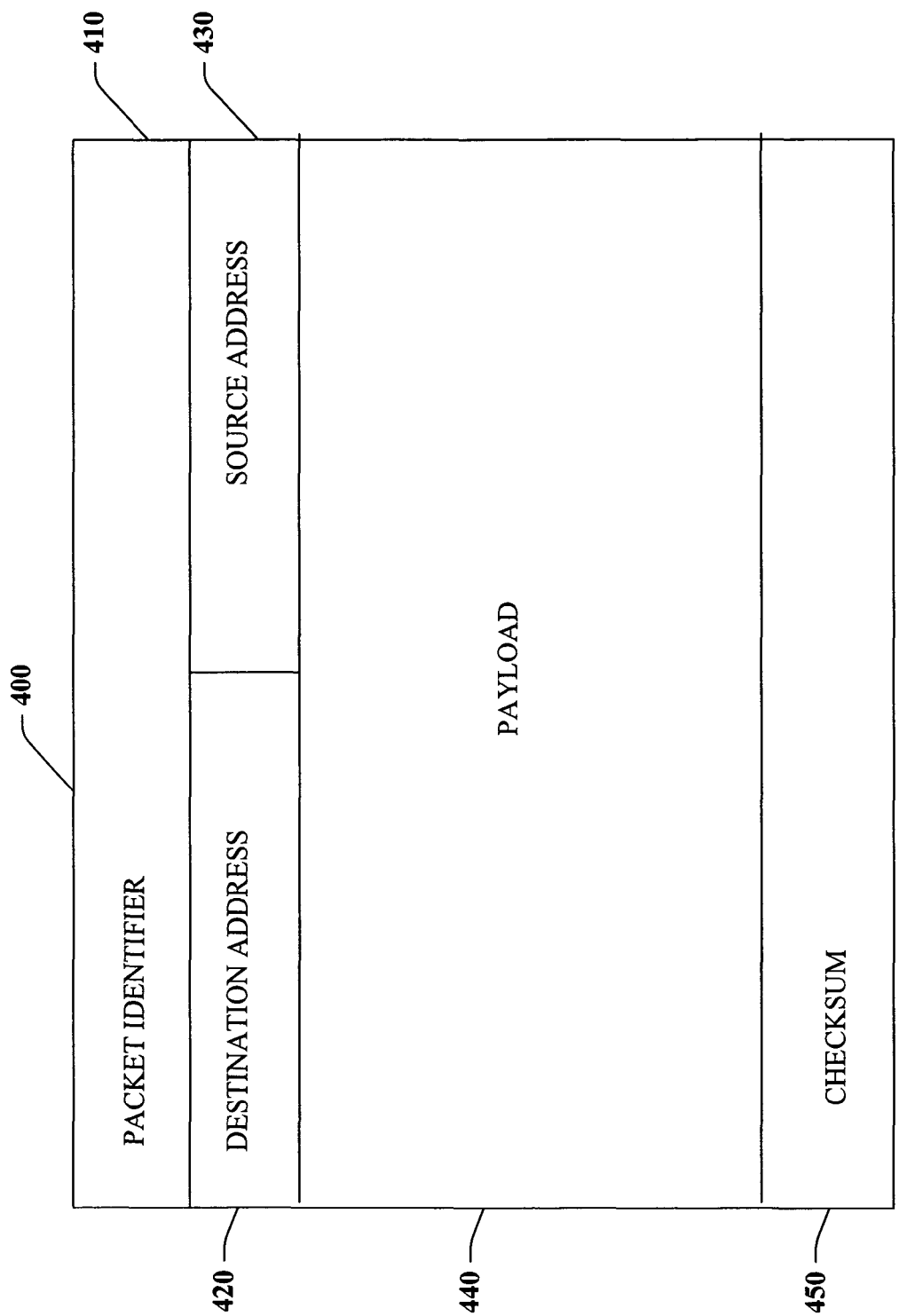
FIG. 4 is a block diagram of a data packet in accordance with one or more aspects of the disclosed invention.

FIG. 4 is a block diagram of a data packet 400 in accordance with one or more aspects of the disclosed invention. Those of ordinary skill in the art will appreciate that a generic packet is depicted and that various aspects of the data packet 400 will vary according to a specific implementation. Additionally, although the term packet is used, for the purposes of this disclosure the term packet also includes, but is not limited to, a frame, a datagram, or another unit of data transmission of a specific protocol.

The data packet 400 includes a packet identification field 410. The packet identification field 410 can serve to identify a type of data packet or serve to identify a specific packet in a series of packets. A destination address field 420 can include an address of a specific device to which the data packet 400 is being transmitted. For untargeted transmission, the destination address field 420 can contain a broadcast address, can be zero filled, or can be filled with some other appropriate information. A source address field 430 can serve to identify the source of the data packet 400 and can include an address of the source, a name of the source, or other appropriate information.

A payload field 440 can contain data that can be used by a wireless communication device or an information system. For example, if the data packet 400 is an initial broadcast packet from a wireless communication device, the payload field 440 can contain an identifier, security credentials, or a request to receive data, among other things. Similarly, if the data packet is an initial broadcast from a data source, the payload field 440 can include instructions that can trigger a connection request from a wireless communication device or can simply be information that can be presented to a user of the wireless communication device.

A checksum field 450 includes data that can be used to check the integrity of the data packet 400 to verify that the contents of the data packet 400 have not been altered or corrupted in transit. Cyclic redundancy check (CRC) data may be included in the checksum field 450, as well as results of a variety of hash functions, among other types of error or integrity checking information. If desired for a specific implementation, the checksum field 450 can be omitted.

Figure 5:
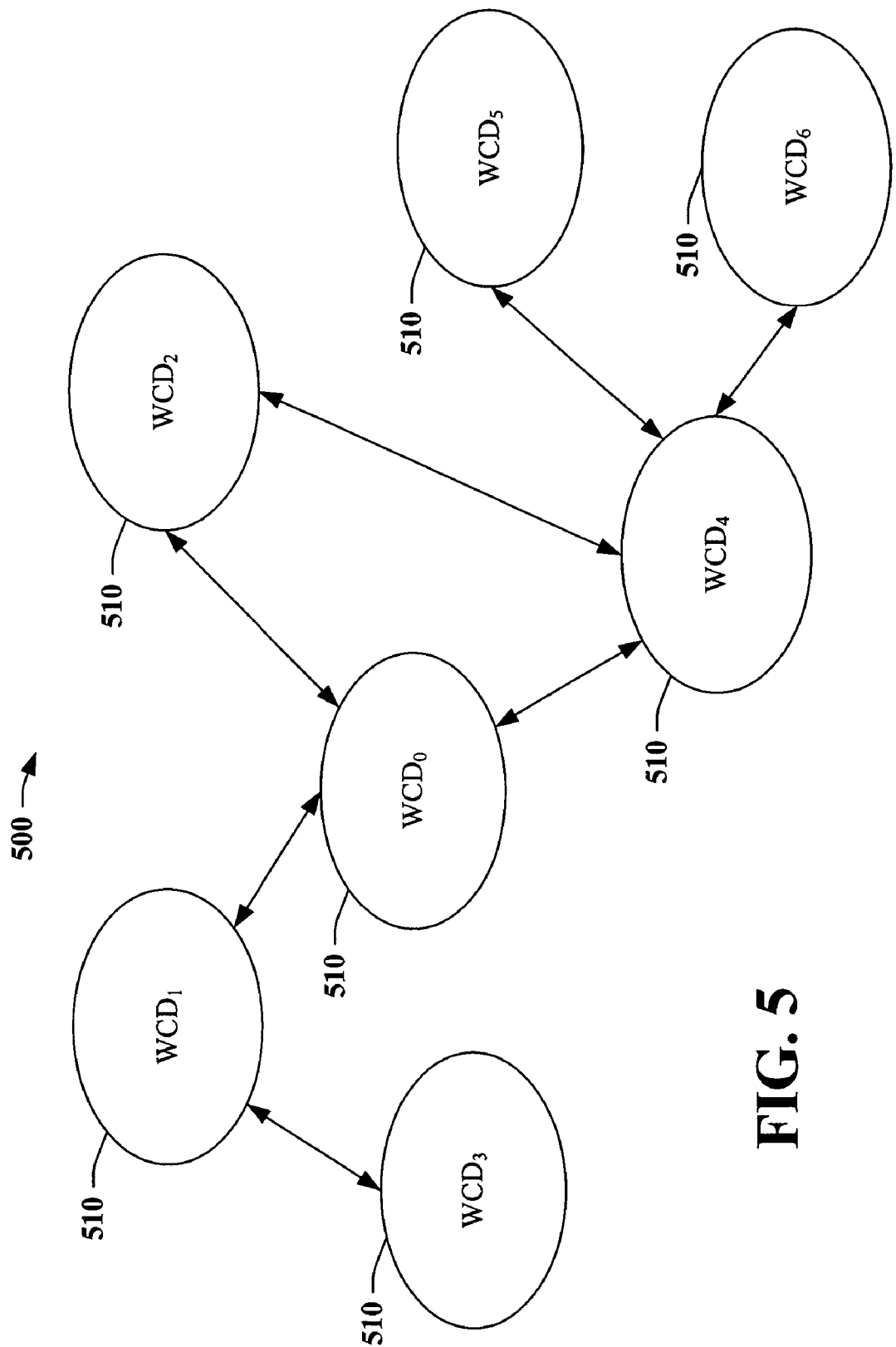
FIG. 5 is a system block diagram of a personal area network in accordance with another aspect of the disclosed invention.

FIG. 5 is a system block diagram of a personal area network 500 in accordance with another aspect of the disclosed invention. The personal area network 500 includes a group of wireless communication devices 510, each of which is connected to at least one other wireless communication device 510 by a data link 520. As each wireless communication device 510 comes within range of another wireless communication device 510, each automatically connects to at least one other to form a personal area network. Such a personal area network can be used for a variety of applications including, but not limited to, business applications and computer gaming.

In the field of business, a system for automatically joining a personal area network can be used for a meeting so that attendees can automatically share relevant business data. Such system can also be combined with proximity detection features, for example, in a conference setting. Conference participants can automatically obtain conference information as soon as they join a personal area network. Proximity detection can allow a participant's wireless communication device to automatically exchange contact information, for example, in the form of an electronic business card, with wireless communication devices of people with whom the participant interacts.

For gaming, automatically joining a personal area network can provide transparent networking capabilities for interaction with other players. For example, two players can automatically connect to play a game in a head-to-head format, such as checkers or chess. More complex, multiplayer games are also aided by automatically joining a personal area network by allowing players to form teams or to interact with players by periodically encountering and leaving those players, much like in real life. Of course, it should be recognized that these are merely illustrative examples and in no way provide an exhaustive list of possibilities.

Figure 6:
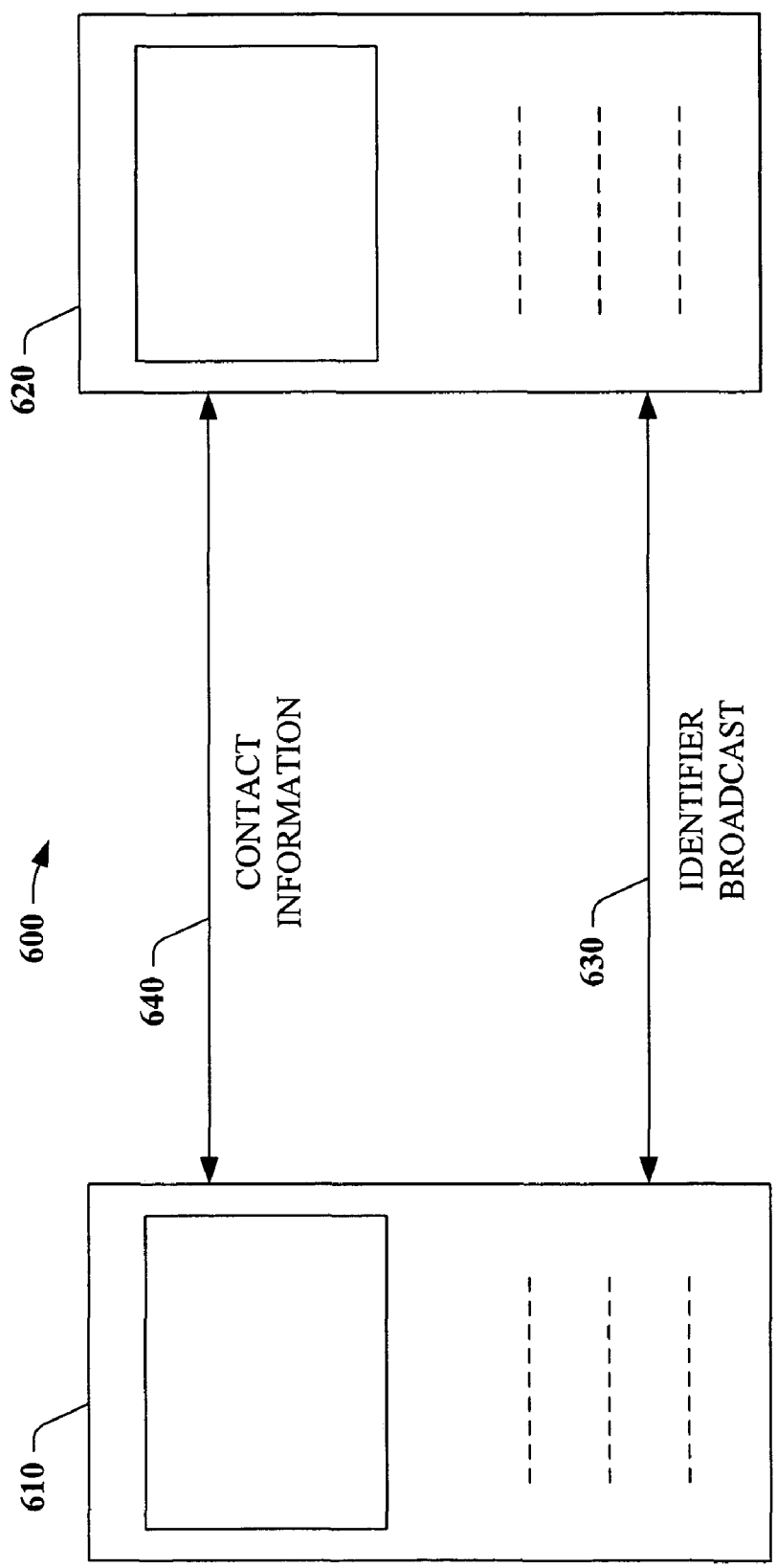
FIG. 6 is a system block diagram of a data communication system in accordance with another aspect of the disclosed invention.

FIG. 6 is a system block diagram of a data communication system in accordance with another aspect of the disclosed invention. The data communication system 600 includes a first wireless communication device 610 and a second wireless communication device 620. Each of the wireless communication devices 610, 620 broadcasts an identifying signal 630. The identifying signal 630 serves to alert other devices to the presence of a wireless communication device and to trigger a data transfer. In this specific example, the data transfer shown is a transfer of contact information 640.

In this example, the transfer of contact information occurs automatically without user intervention. This feature can be activated and deactivated by a user of the wireless communication devices 610, 620. Additionally or alternatively, this feature can be combined with a verification or authentication feature to limit automatic data transfers to only such devices that are known or trusted.

Figure 7:
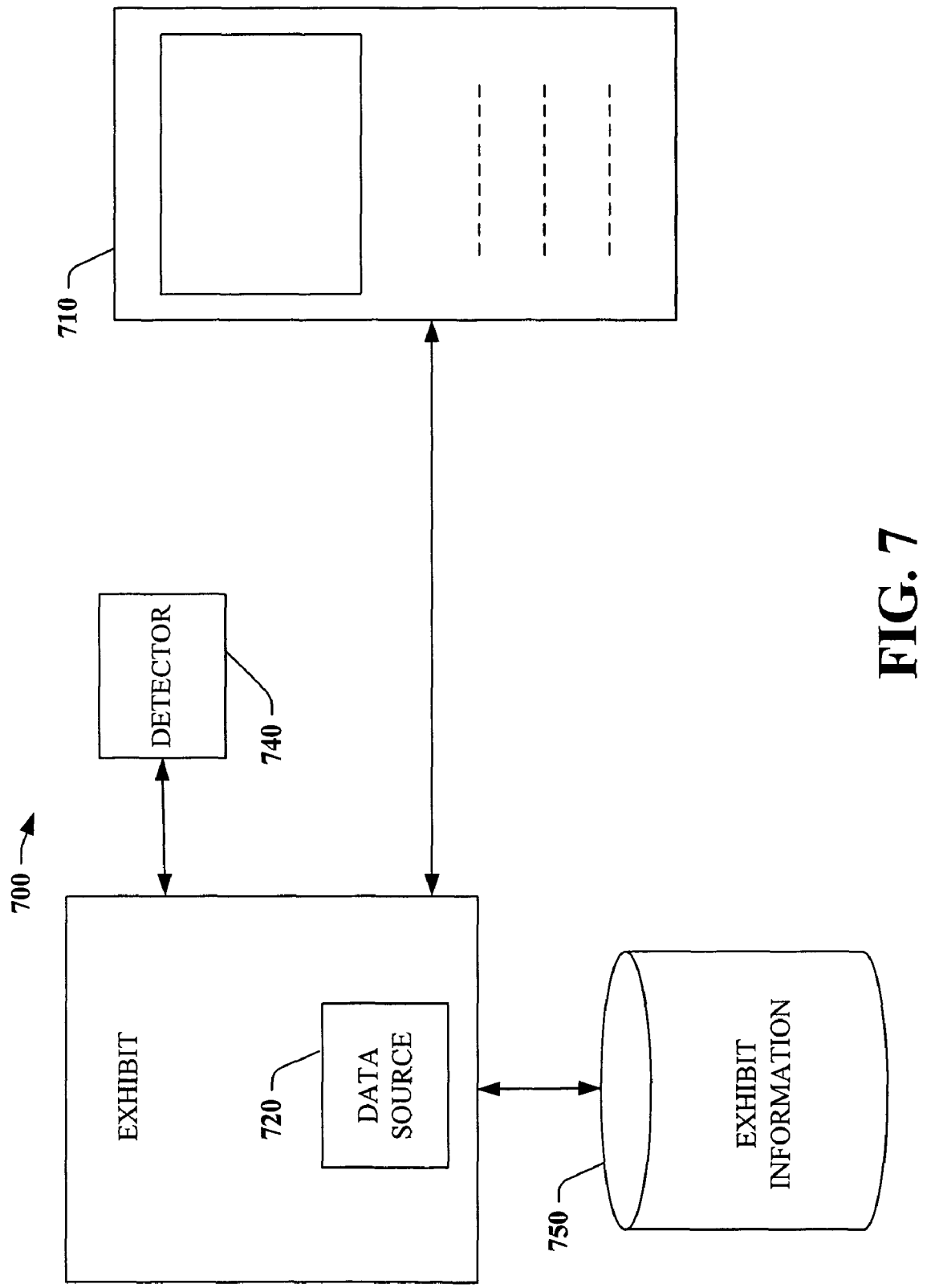
FIG. 7 is a system block diagram of a data communication system in accordance with yet another aspect of the invention.

FIG. 7 is a system block diagram of a data communication system 700 in accordance with yet another aspect of the invention. The data communication system 700 is depicted as implemented in an exhibition setting, such as can be found in a museum, an art gallery, or a trade show, among others. In this example, a wireless mobile device 710 is shown within range of a data source 720 of an exhibit 730. A detector 740 can detect the presence of the wireless mobile device 710 and signal the data source 720. The data source 720 can access an exhibit data store 750 that includes information about the exhibit 730. The data source 720 can send information from the exhibit data store 750 to the wireless mobile device 710.

One example of such a system in operation follows. The wireless mobile device 710 travels into range of the data source 720. The detector 740 detects the wireless mobile device 710 and sends a signal to the data source 720. The signal indicates to the data source that a wireless mobile device such as the wireless mobile device 710 is in range. The data source 720 accesses information about the exhibit 730 from the exhibit data store 750. The information may be a text file, an image, an HTML file, or some other suitable information. The data source 720 automatically sends the information to the wireless mobile device 710 which presents the information to a user of the wireless mobile device either automatically or in response to a specific command.

Figure 8:
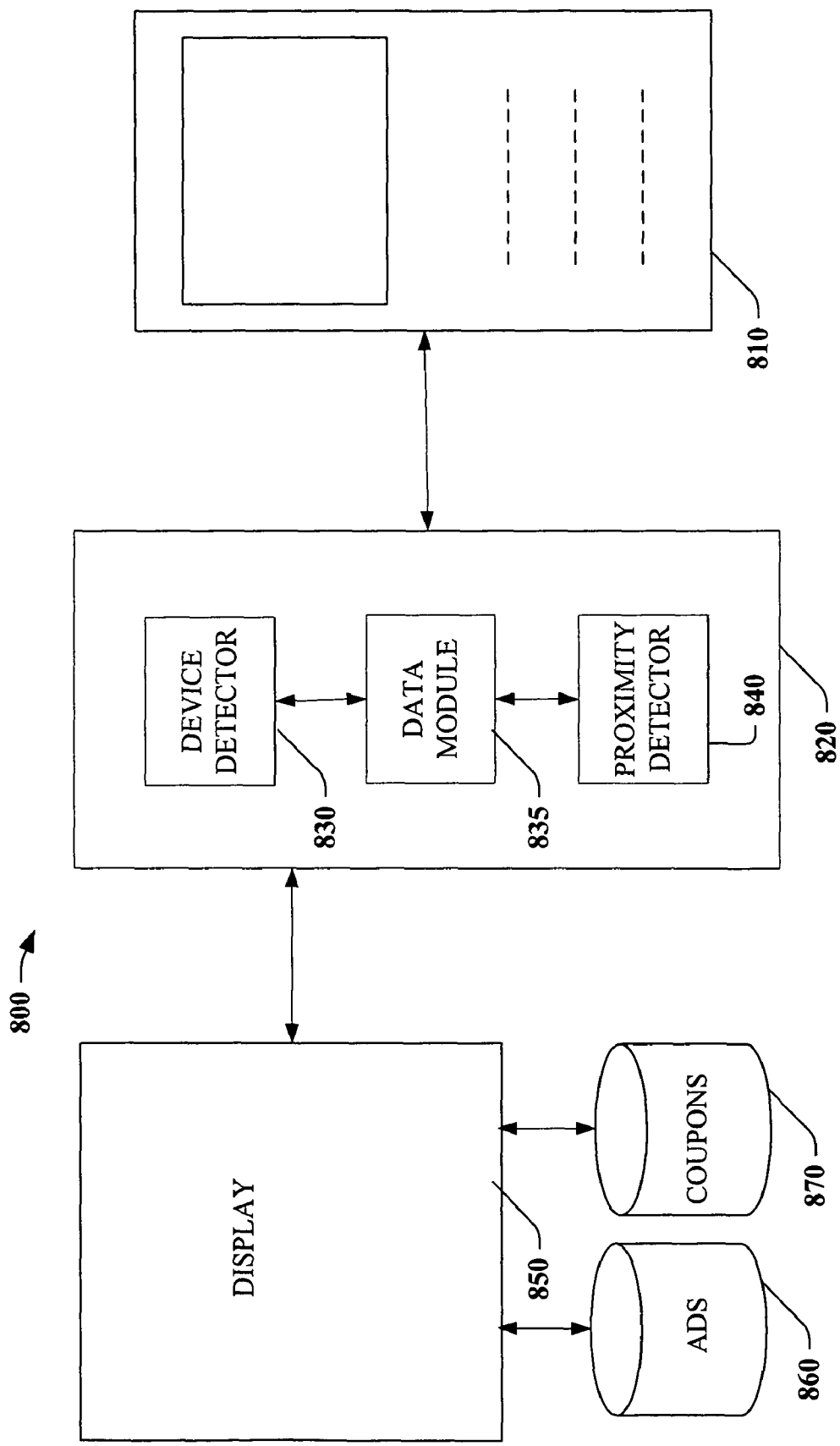
FIG. 8 is a system block diagram of a data communication system in accordance with still another aspect of the invention.

FIG. 8 is a system block diagram of a data communication system 800 in accordance with still another aspect of the invention. The data communication system 800 is shown in a marketing context. A wireless mobile device 810 can communicate with a data source 820. The data source 820 includes a device detector 830, a data module 835, and a proximity detector 840. The device detector 830, the data module 835, and the proximity detector 840 can be implemented as previously disclosed with reference to earlier figures. The data source is associated with a product display 850. The product display 850 can be set up to present a good or service to a consumer in an aesthetically pleasing way. The data source 820 is also connected to an advertising data store 860 and a coupon data store 870.

The device detector 830 can determine when a wireless mobile device is within range of the data source 820. When the device detector 830 detects a device, it can send a signal to the data module 835 to cause the data module 835 to access the advertising data store 860. The data module 835 can send information from the advertising data store 860 to the wireless mobile device 810. The proximity detector 840 can determine when the wireless mobile device 810 has entered a proximity zone. The proximity detector can then send a signal to the data module to cause the data module 835 to access the coupon data store 870. The data module 835 can then send information from the coupon data store 870 to the wireless mobile device 810.

An example of an implementation of the data communication system in operation is presented here. When the wireless mobile device 810 comes within range of the data source 820 associated with the product display 850, the device detector 830 sends a signal to the data module 835 that indicates that a wireless mobile device is within range. The data module 835 then accesses advertising information about a product on display from the advertising data store and automatically sends that information to the wireless mobile device 810. A user of the wireless mobile device 810 can then access information about the product on the wireless mobile device.

When the wireless mobile device 810 travels within range of the proximity detector 840, the proximity detector 840 sends a signal to the data module 835 that indicates that the wireless mobile device has traveled closer to the data source 820 and/or the associated product display 850. The data module 835 then accesses coupon information of the coupon data store 870 and sends that information to the wireless mobile device 810. The user of the wireless mobile device 810 can then access an electronic coupon for the product on display on the wireless mobile device 810.

With reference to FIGS. 9-12, flowcharts in accordance to various aspects of the invention are presented. While, for purposes of simplicity of explanation, the one or more methodologies shown herein, for example, in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 9:
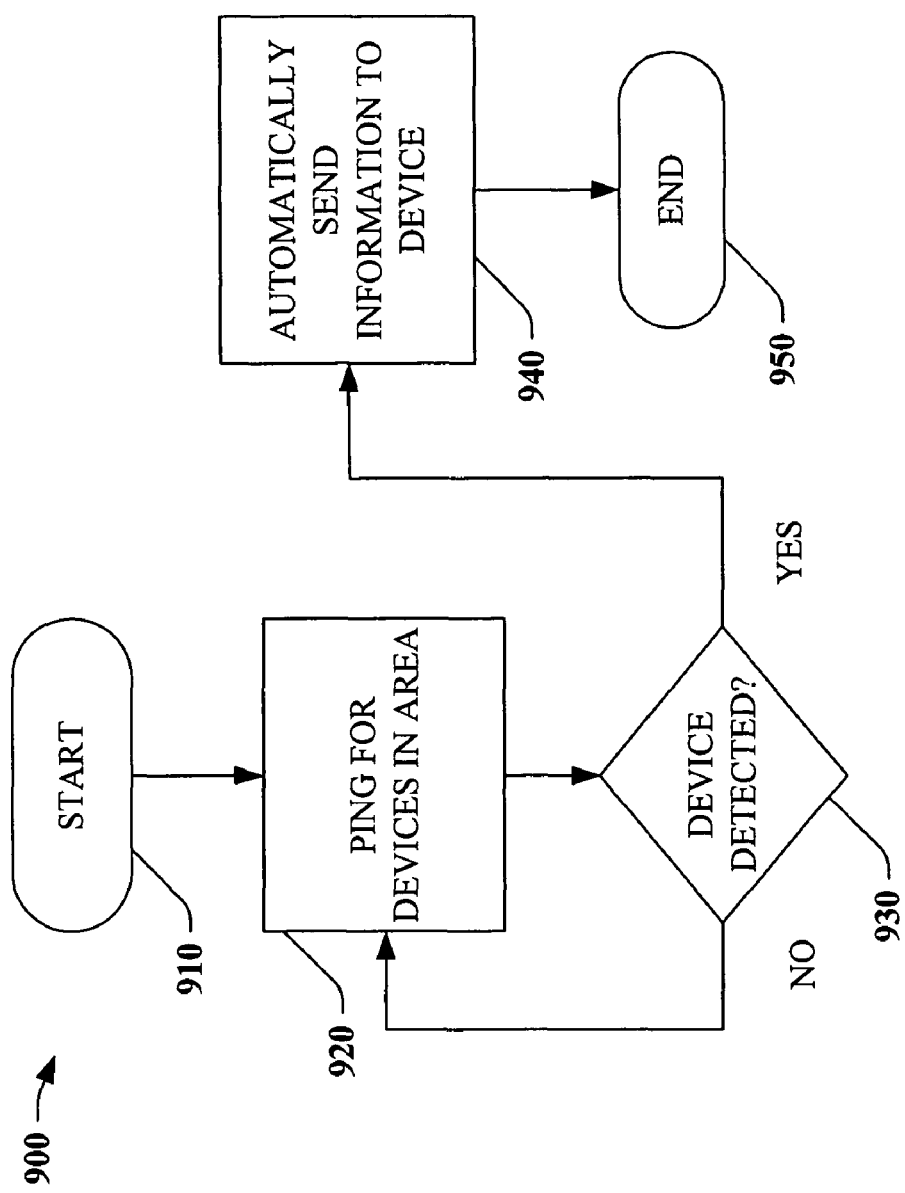
FIG. 9 is a flow diagram depicting a general processing flow in accordance with still another aspect of the invention.

FIG. 9 is a flow diagram depicting a general processing flow 900 in accordance with still another aspect of the invention. Processing begins at START block 900 and continues to process block 910. At process block 910 a ping signal is transmitted to search for devices in range. Processing continues to decision block 930 where a determination is made whether a device has been detected. If no, processing returns to process block 920 where another ping signal is generated. If yes, information is automatically transmitted to the detected device at process block 940. Processing then concludes at END block 950.

It should be appreciated that the act of pinging for devices at process block 920 includes, but is not limited to, any method of polling for devices or broadcasting an identifier or by another method that is a suitable substitute for locating a wireless communication device. This act may be performed by a wireless mobile device or by an information server. When performed by a wireless mobile device, the wireless mobile device can also be attempting to receive ping signals broadcast from other wireless mobile devices. There are at least two scenarios where a first wireless mobile device can receive an initial ping signal from a second wireless mobile device that the first wireless mobile device has not detected with its own initial ping signal. The first is where the two wireless mobile devices moved within range of each other during a time between pings and the second wireless mobile device sends its initial ping signal before the first wireless mobile device. The second is where the second wireless mobile device has a greater range than the first wireless mobile device. This greater range may be due to component configuration, power availability, signal interference, or some other factor.

Figure 10:
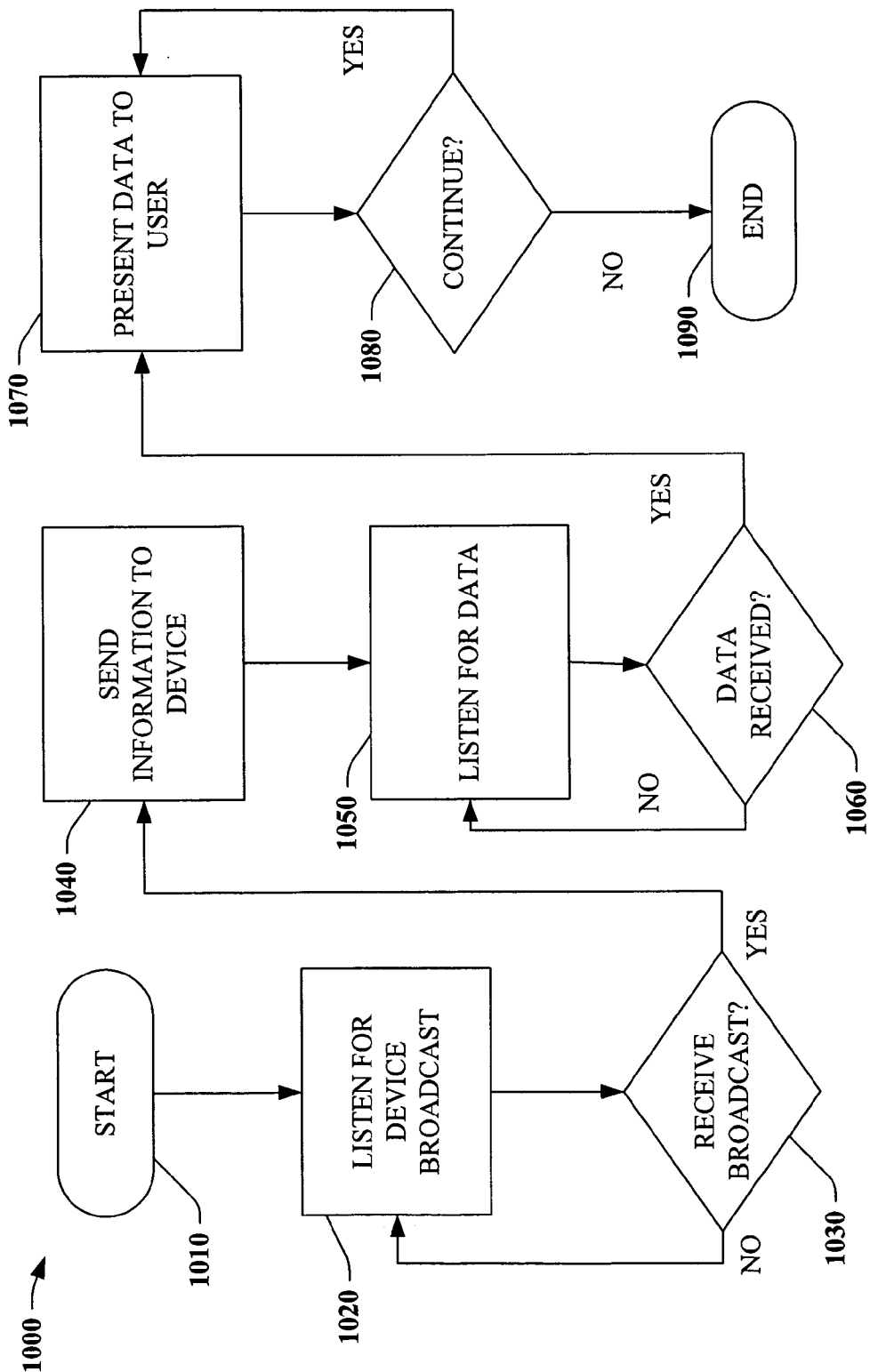
FIG. 10 is a flow diagram depicting a general processing flow in accordance with still another aspect of the invention.

FIG. 10 is a flow diagram depicting a general processing flow 1000 in accordance with still another aspect of the invention. The illustrated procedure begins at START block 1010 and continues to process block 1020. At process block 1020 a device awaits reception of a broadcast device identifier signal. At decision block 1030 a determination is made whether a broadcast identifier has been received. If no, processing returns to process block 1020. If yes, processing continues to process block 1040 where information is retrieved and automatically sent to the device that broadcast the identifier signal.

The information retrieved and sent at process block 1040 can be a generic set of information that is sent to any detected wireless mobile device. For example, the information can be advertising relating to a product on display, information about a painting in a gallery or its artist, or a map of a wing of a museum, among other things. Such generic information can be sent specifically to the detected wireless mobile device or simply broadcast in a form that any wireless mobile device can receive, for example, sent to a broadcast address, when a wireless mobile device is detected. Additionally or alternatively, the information can be customized for a specific device or user by a variety of methods such as accessing user preferences or another suitable approach.

At process block 1050, the wireless mobile device listens for inbound data containing information of interest. Processing continues at decision block 1060 where a determination is made whether data has been received. If no, processing returns to process block 1050. If yes, processing continues to process block 1070 where the received data is presented to the user. At decision block 1080, a determination is made whether the device should continue to listen for additional data. This determination can be a user-selectable preference to allow a user to deactivate automatic information receipt at various times as desired. If yes, processing returns to process block 1050. If no, processing terminates at END block 1090.

Figure 11:
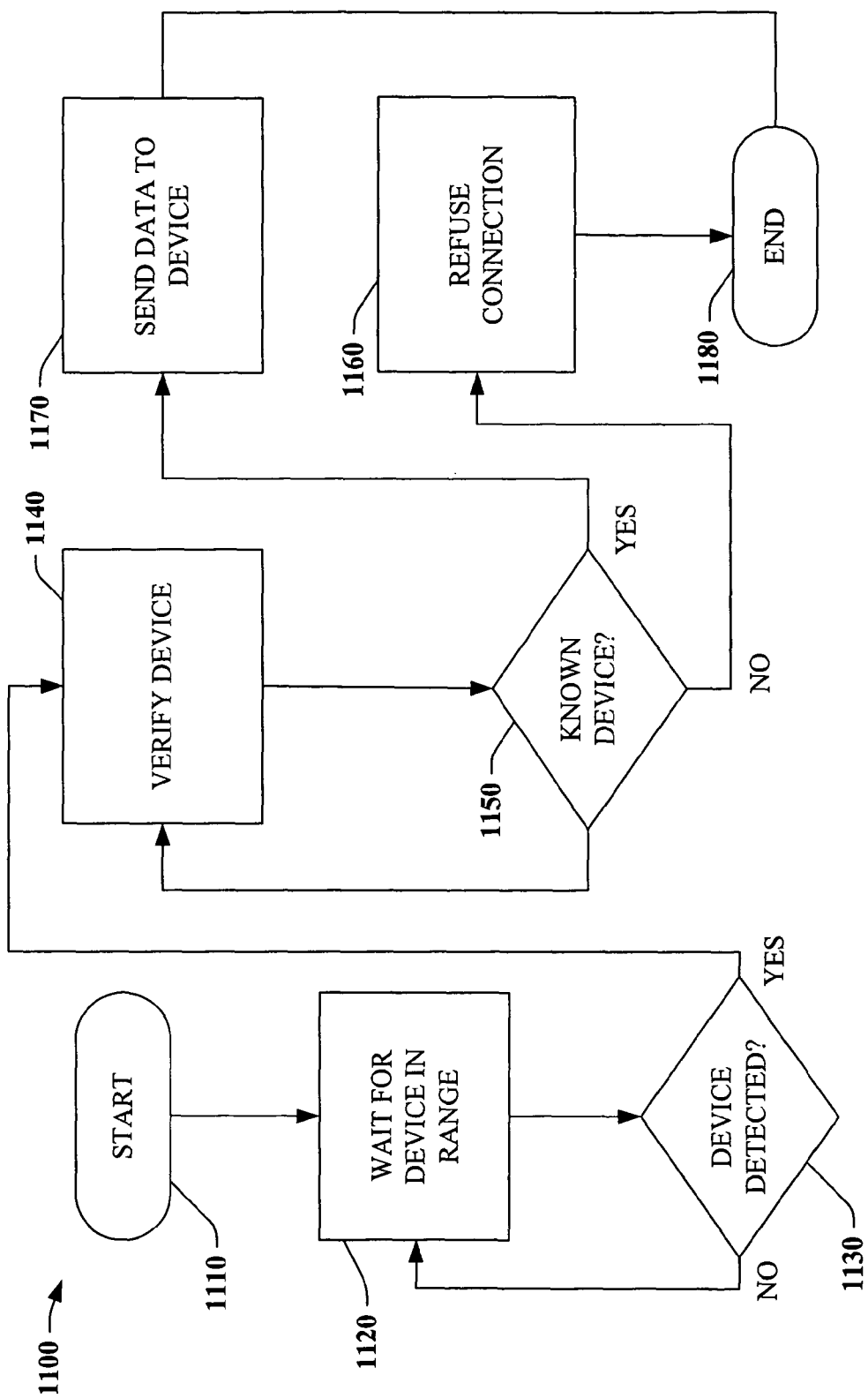
FIG. 11 is a flow diagram depicting a general processing flow in accordance with still another aspect of the invention.

FIG. 11 is a flow diagram depicting a general processing flow 1100 in accordance with still another aspect of the invention. Processing begins at START block 1110 and continues to process block 1120 where a system waits for a wireless communication device to come into range. At decision block 1130 a determination is made whether a wireless communication device has been detected. If no, processing returns to process block 1120. If yes, processing continues to process block 1140. At process block 1140 the wireless device is attempted to be verified. Processing then continues to decision block 1150 where a determination is made whether the wireless communication device is a known device. If no, processing continues to process block 1160 where the wireless communication device is refused permission to connect and obtain data. If yes, processing continues to process block 1170 where a connection is allowed and data sent to the wireless communication device. Processing concludes from either process block 1160 or process block 1170 at END block 1180.

It should be noted that in this example the system passively waits until a wireless communication device announces its presence in the area by broadcasting an identifier. However, other models, specifically including an active ping system as described in conjunction with other drawings, can also be used. Additionally, a number of approaches can be used as the verification process at process block 1140. Such approaches include the use of a unique identifier for a wireless communication device or the use of a security certificate, among others.

Figure 12:
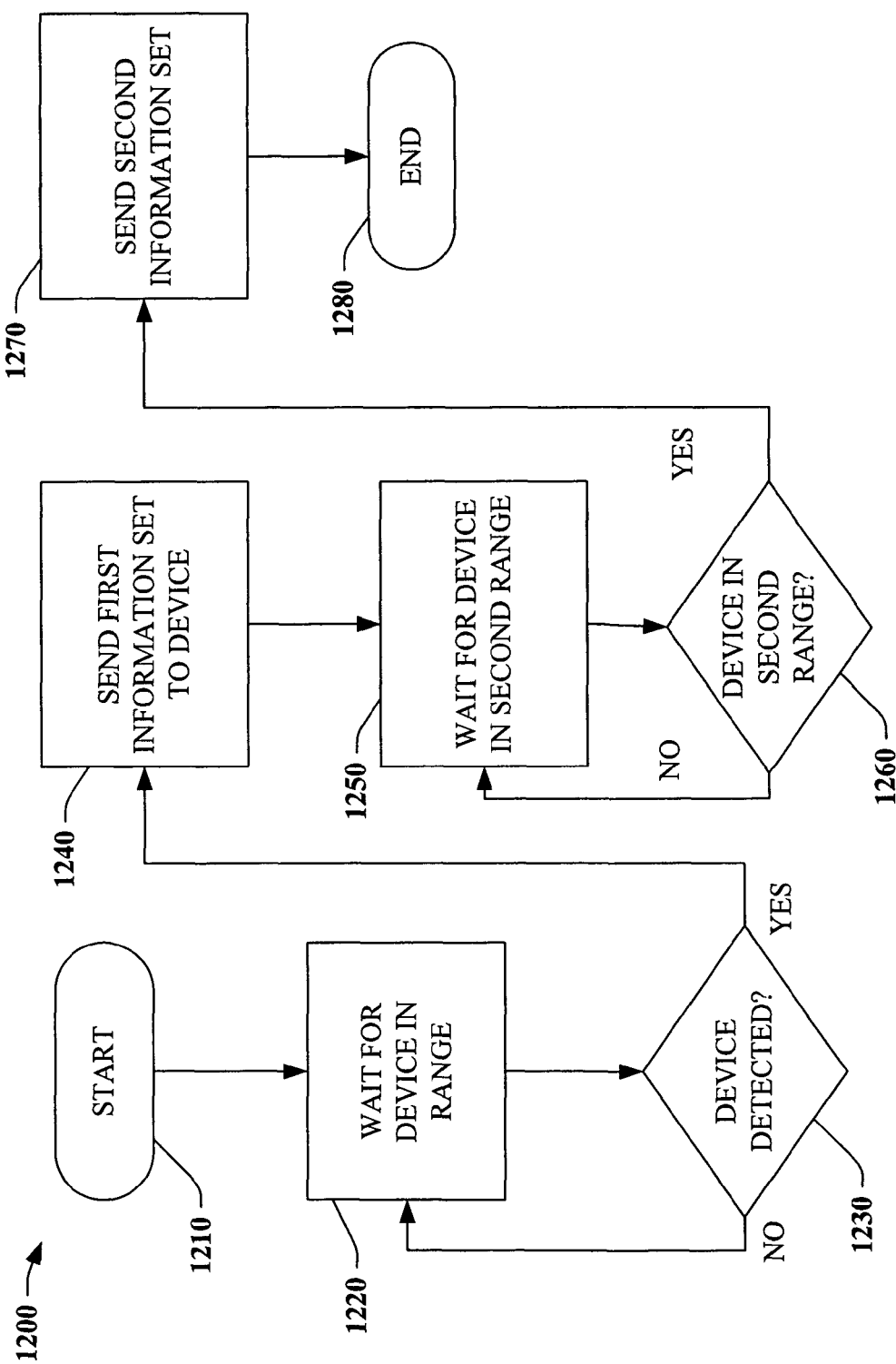
FIG. 12 is a flow diagram depicting a general processing flow in accordance with a further aspect of the invention.

FIG. 12 is a flow diagram depicting a general processing flow 1200 in accordance with a further aspect of the invention. Processing begins at START block 1210 and continues to process block 1220. At process block 1220 a system waits for a wireless mobile device to come within range. Processing continues to decision block 1230 where a determination is made whether a wireless communication device has been detected within range. As was similarly explained with reference to other figures, such determination can be server-driven as with an active ping sent by an information system or can be client-driven as with an identifier broadcast by a wireless communication device. If the determination is no, processing returns to process block 1220.

If the determination made at decision block 1230 is yes, processing continues to process block 1240 where a first set of information is sent to the wireless communication device. At process block 1250, the system waits for the wireless communication device to come within a second range. Also as previously discussed with reference to other figures, approaches such as measuring signal strength or use of a near-field communication device such as an RFID system can be employed. At process block 1260 a determination is made whether the wireless communication device has entered a second range. If no, processing returns to process block 1250. If yes, processing continues to process block 1270 where a second set of information is sent to the wireless communication device. Processing terminates at END block 1280.

It should be noted that various aspects of the invention discussed herein can be modified in a specific implementation. For example, one possible modification is to detect when a mobile device is within range but not send any data to the device until the wireless communication device comes within a second range detected by the proximity detector. Similarly, the system can be configured to send information when a device is within range but merely register or log whether the device comes within a second range detected by the proximity detector. Various statistics from these scenarios (for example, percentage of times a wireless mobile device comes within range but is not detected by the proximity detector) can be derived and applied to a specific implementation context to ascertain effectiveness of associated components such as product displays.

The subject invention, for example in connection with detection or identification tasks, can employ various artificial intelligence-based schemes for carrying out various aspects thereof. For example, a verification process for determining whether access should be permitted can be facilitated by using an automatic classifier system and process. Moreover, when more than one component is in use, for example, multiple wireless communication devices or multiple information systems fairly close together, an automatic classifier system can be used to manage multiple communications and prevent overly redundant communications.

A classifier is a function that maps an input attribute vector, $X=(x_1, x_2, x_3, x_4, \ldots x_n)$, to a confidence that the input belongs to a class, that is, $f(X)=\text{confidence(class)}$. Such classification can employ a probabilistic and/or statistical-based analysis (for example, factoring into the analysis utilities and costs) to prognose or infer an action that a user desires to be automatically performed. In the case of software component replacement systems, for example, attributes can be file descriptors such as filenames, signatures, hash functions, upgrade codes, compatibility codes, version numbers, build numbers, release dates, or other data-specific attributes derived from the device driver files and the classes are categories or areas of interest, for example, descriptors of other device drivers that the device driver can update.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (for example, by a generic training data) as well as implicitly trained (for example, by observing user behavior, receiving extrinsic information). For example, SVM's are configured by a learning or training phase within a classifier constructor and feature selection module. Thus, the classifier(s) can be used to automatically perform a number of functions, including but not limited to determining whether a device should be sent data.

Figure 13:
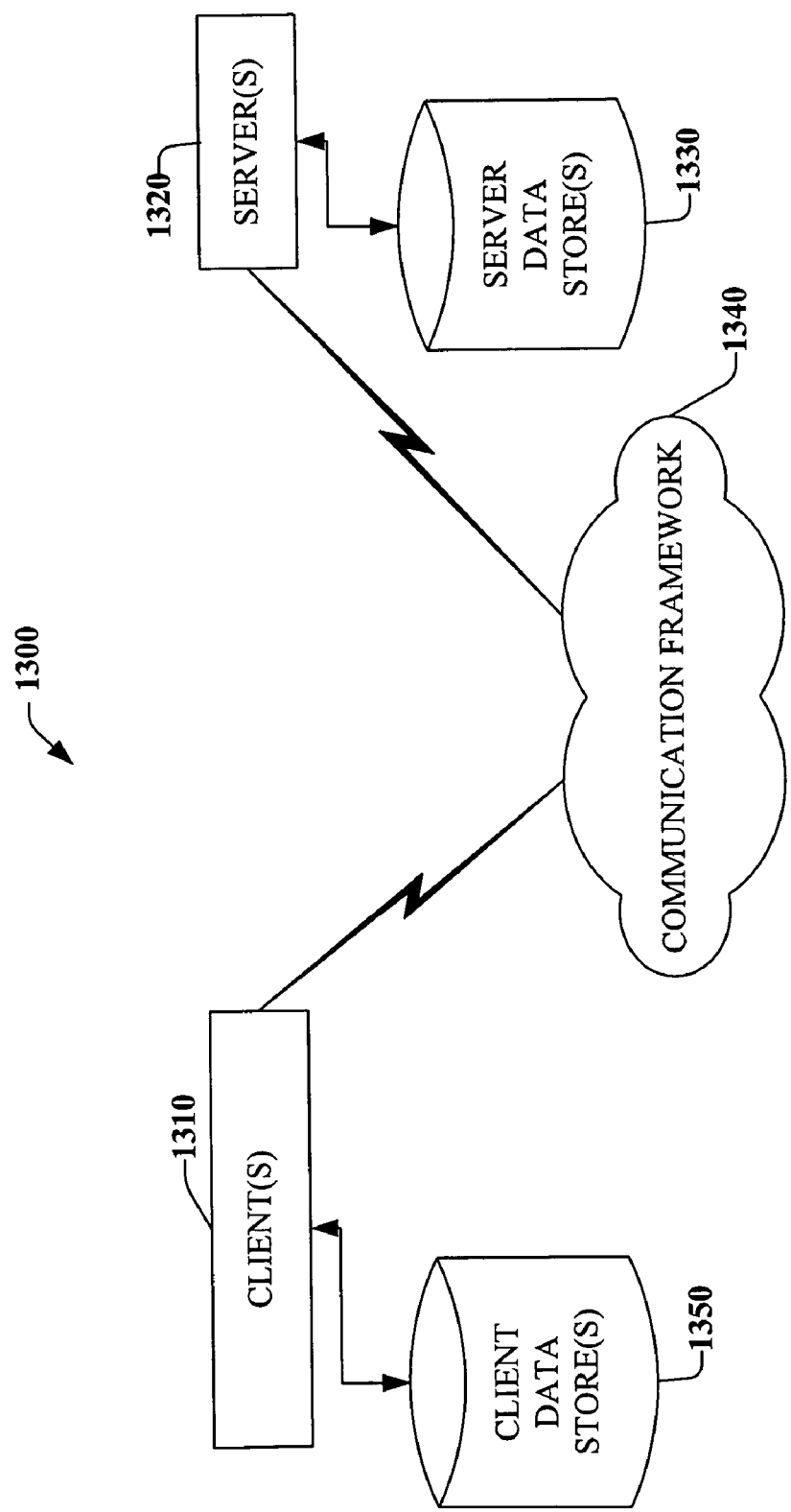
FIG. 13 illustrates an exemplary networking environment, wherein the novel aspects of the subject invention can be employed.
Figure 14:
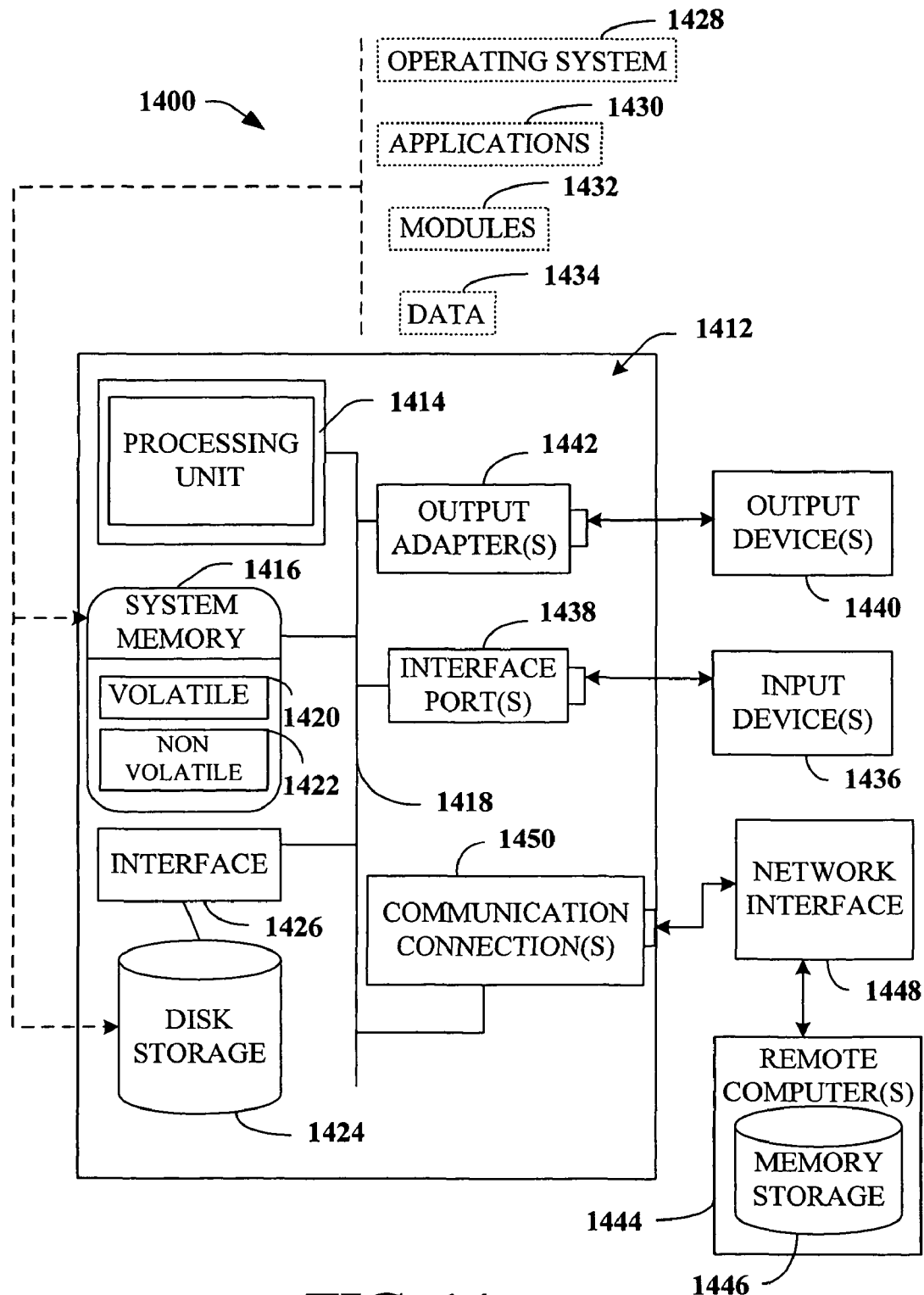
FIG. 14 illustrates an exemplary operating environment, wherein the novel aspects of the subject invention can be employed.

In order to provide additional context for implementing various aspects of the subject invention, FIGS. 13-14 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads or processes to perform transformations by employing the subject invention, for example.

One possible means of communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1340.

With reference to FIG. 14, an exemplary environment 1400 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multi-processor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. For example, FIG. 14 illustrates a disk storage 1424. The disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. The operating system 1428, which can be stored on the disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. The input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for data communication, comprising:
    a detection module that ascertains when a mobile wireless communication device is located within a first range of a data source;
    a proximity detector that determines whether the mobile wireless communication device is within a second range from the data source that is less than the first range;
    a verification module that determines, when the detection module has determined that the mobile wireless communication device is located within the first range, whether the mobile wireless communication device is a known device based on a previous pairing with the data source or acceptable security credentials; and
    a data transfer module associated with the data source having access to a primary data store and a secondary data store,
    where the data transfer module upon direction of the detection module automatically sends first information from the primary data store in at least one first data packet comprising a payload field containing at least a first identifier and security credentials to the known mobile wireless communication device when the mobile wireless communication device is within the first range, and
    where the data transfer module upon direction of the proximity detector automatically sends second information from the secondary data store in at least one second data packet comprising a payload field containing at least a second identifier and security credentials to the known mobile wireless communication device when the mobile wireless communication device is within the second range.

2. The system of claim 1, wherein the information includes data to be synchronized with data of the mobile wireless communication device.

3. The system of claim 1, wherein the mobile wireless communication device is one of a personal information manager, a cellular telephone, a personal digital assistant, and a palmtop computer.

4. The system of claim 1, wherein the proximity detector includes a near-field communication device.

5. The system of claim 4, wherein the mobile wireless communication device is a Bluetooth device.

6. The system of claim 1, wherein the first information and the second information are different.

7. A computer implemented method for data communication, comprising:
- detecting through a detection module when a wireless computing device is within a first range of a data source;
- verifying, upon detecting that the wireless computing device is located within the first range, that the wireless computing device is a known device by validating at least one of a previous pairing with the data source and security credentials;
- automatically initiating through a data transfer module associated with the data source a first data transfer from a primary data store comprising at least one data packet having a payload field containing at least a first identifier and security credentials to the known wireless computing device when the known wireless computing device is in the first range;
- detecting through a proximity detector module when the known wireless computing device is within a second range from the data source that is less than the first range; and
- automatically initiating through a data transfer module associated with the data source a second data transfer from a second data store comprising at least one data packet having a payload field containing at least a second identifier and security credentials to the known wireless computing device when the known wireless computing device is in the second range.

8. The method of claim 7, further comprising synchronizing information of the data source with information of the wireless computing device.

9. The method of claim 7, further comprising calculating a measure of proximity of the wireless computing device to the data source.

10. A method of claim 9, wherein calculating a measure of proximity of the wireless computing device to the data source includes measuring a strength of a signal.

11. The method of claim 7, further comprising using a near field communication device to determine whether the wireless computing device is within the second range from the data source.

12. The method of claim 7, wherein the first data transfer and the second data transfer are different.

13. A system for data communication, comprising:
- means for detecting through a detection module when a wireless computing device is in a first range of a data source;
- means for determining, when the detection module has determined that the wireless computing device is located within the first range, whether the wireless computing device is a known device based on a previous pairing with the data source or acceptable security credentials;
- means for automatically initiating through a data transfer module associated with the data source a first data transfer from a primary data store comprising at least one data packet having a payload field containing at least a first identifier and security credentials when the wireless computing device is in the first range;
- means for detecting through a proximity detector module when the known wireless computing device is within a second range less than the first range of the data source; and
- means for automatically initiating through a data transfer module associated with the data source a second data transfer from a second data store comprising at least one data packet having a payload field containing at least a second identifier and security credentials to the known wireless computing device when the known wireless computing device is in the second range.

14. The system of claim 13, further comprising means for synchronizing information of the data source with information of the wireless computing device.

15. The system of claim 13, further comprising means for calculating a measure of proximity of the wireless computing device to the data source.

16. The system of claim 13, wherein the first data transfer and the second data transfer are different.

\* \* \* \* \*